Nov. 22, 1949

C. A. JUDSON 2,488,867

NOZZLE-GUIDE-VANE ASSEMBLY
FOR GAS TURBINE ENGINES

Filed Oct. 13, 1947

INVENTOR
CHARLES A. JUDSON
by Wilkinson Mawhinney
ATTORNEYS

Nov. 22, 1949 C. A. JUDSON 2,488,867
NOZZLE-GUIDE-VANE ASSEMBLY
FOR GAS TURBINE ENGINES
Filed Oct. 13, 1947 3 Sheets-Sheet 3

INVENTOR
CHARLES A. JUDSON
By Wilkinson Mawhinney
ATTORNEYS

Patented Nov. 22, 1949

2,488,867

UNITED STATES PATENT OFFICE 2,488,867

NOZZLE-GUIDE-VANE ASSEMBLY FOR GAS TURBINE ENGINES

Charles Alan Judson, Cranfield, Bedford, England, assignor to Rolls-Royce Limited, Derby, England, a British company Application October 13, 1947, Serial No. 779,554
In Great Britain October 2, 1946

Section 1, Public Law 690, August 8, 1946
Patent expires October 2, 1966

6 Claims. (Cl. 253—65)

This invention relates to gas-turbine-engines of the kind comprising a compressor-unit, combustion-equipment and turbine-assembly. A particular though not exclusive application of the invention is to turbine-engines for aircraft-propulsion, either functioning as a pure jet-propulsion unit or of the kind in which the turbine drives an airscrew or fan, in addition to providing a degree of jet-reaction due to turbine-exhaust. The invention may however be applied to any form of gas-turbine-engine, in which the turbine is of the axial flow type, involving one or more stages or rotating blading, and corresponding stages of fixed blading, the fixed blading being referred to as the "nozzle-guide-vane assembly," each such assembly being related to a single stage of the turbine.

The object of the invention is to provide a turbine-assembly for a gas turbine engine of the kind referred to, presenting features of advantage in respect of ease of assembly and dissembly, lightness of structure and convenience of manufacture, together with freedom from thermal distortion effects.

According to one feature of the present invention, a nozzle-guide-vane assembly for a gas-turbine-engine of the kind referred to comprises a plurality of segments which when assembled form an annular turbine nozzle, wherein each segment includes inner and outer blade-mounting platforms with fixed blading extending therebetween, the outer platforms are formed with outwardly-directed spline or teeth formations and with axially-directed spigot formations engaging complementary formations on stationary supporting structure of the turbine system whereby said outer platforms are located axially radially and circumferentially in the supporting structure, and the inner platforms are provided on their surfaces remote from the blading with spigot means engaging an inner ring, such spigot means locating the inner platforms circumferentially and axially relative to one another and permitting relative radial expansion between the inner ring and segments.

According to a further feature of the invention, the inner ring may be supported within the turbine supporting structure concentric with the axis of the turbine solely by the segments, and may comprise a part co-operating with a complementary part rotating with the turbine rotor assembly to provide a gas-seal therebetween. In applying this arrangement to a multi-stage turbine, the inner ring is conveniently located between a pair of turbine rotor discs.

In a preferred construction, the inner platforms are spigotted to the inner ring by inwardly-directed flanges co-operating in a plane transverse to the turbine axis with a flange or groove formation on the inner ring, there being provided pin or equivalent means carried by one of said flanges engaging radial slots in the other, and the splines or teeth on the outer platforms engage an outer ring encircling the segments and spaced from the latter to provide an annular space for stagnant gas or for the passage of cooling air. If desired, the outer platforms may be formed with axial extension to constitute a shroud ring for the moving turbine blading.

A preferred embodiment of this invention will now be described as applied to the nozzle-guide-vane assembly of a two-stage turbine of a gas-turbine-engine of the kind referred to, the description having reference to the accompanying drawings in which.

Figure 1:
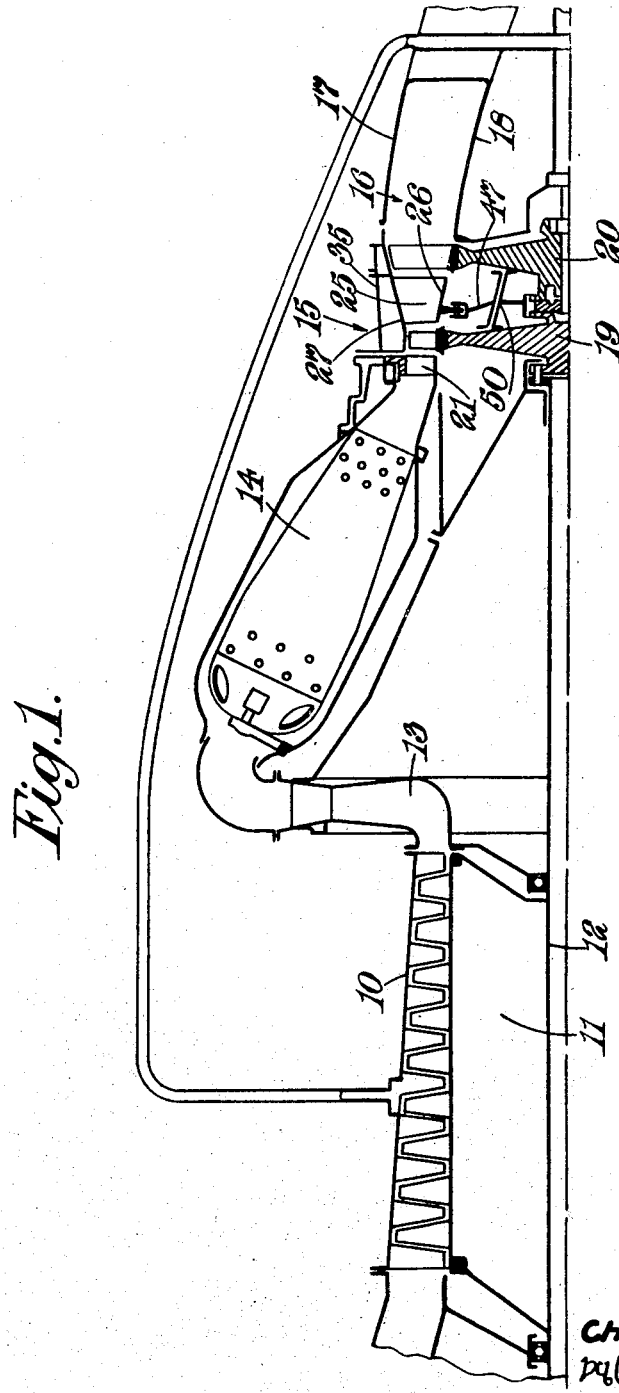
Figure 1 is a diagrammatic section through half of the gas-turbine-engine.

Referring to Figure 1, the gas-turbine-engine comprises a compressor 10, the rotor 11 of which is mounted on a shaft 12, and which delivers air through a duct 13 to the combustion equipment 14 of the gas-turbine-engine. The combustion equipment comprises a number of combustion chambers such as that illustrated, disposed in a ring around the shaft 12 and extends between compressor 10 and a two-stage turbine 15. Fuel is burnt in the air in the combustion chambers and the combustion products pass from the combustion chambers through the turbine 15 to drive it and the turbine in turn drives the compressor through the shaft 12. The exhaust gases pass from the turbine 15 into an annular exhaust duct 16 formed between an outer casing 17 and a centrally disposed conical member 18.

Figure 2:
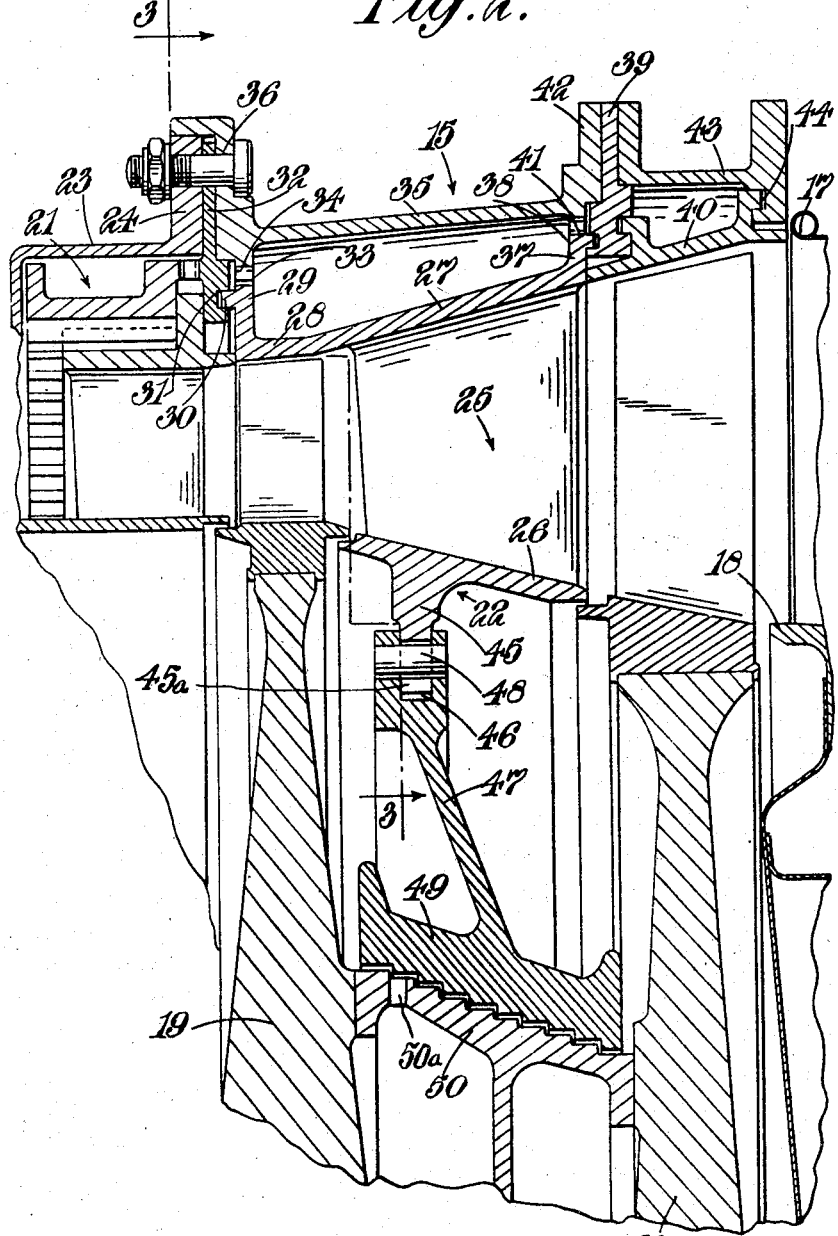
Figure 2 is a radial section through the turbine of the gas turbine engine.
Figure 3:
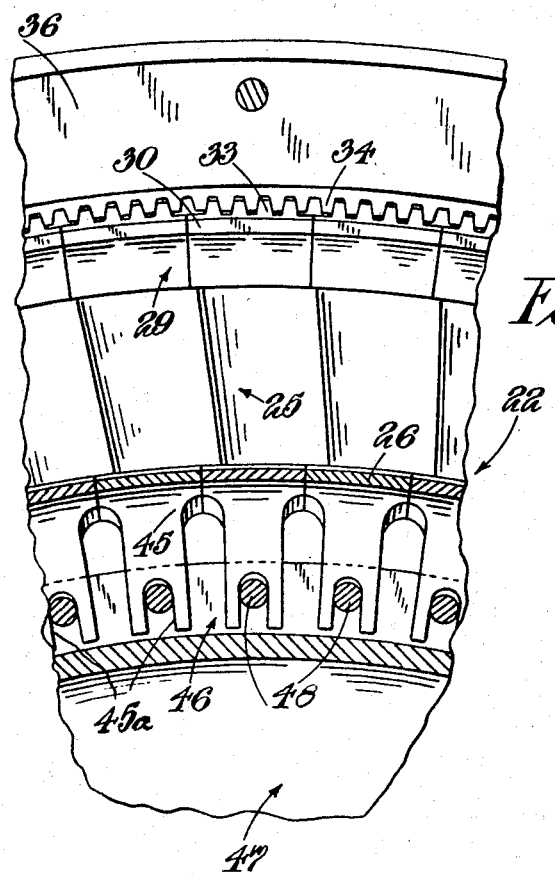
Figure 3 is a fragmental view taken on the line 3—3 of Figure 2.

Referring now to Figures 2 and 3, the turbine is of the two-stage type and comprises two turbine discs 19 and 20 which are connected together and mounted on the shaft 12 as described in British Patent No. 617,474. The turbine discs 19 and 20 are supported within an enclosing stationary structure and the combustion gases pass from the combustion equipment 14 to the blades of the high pressure turbine disc 19 through the nozzle-guide-vane assembly 21, and then flow from the high pressure turbine through the nozzle-guide-vane assembly 22 to the blades of the low pressure turbine disc 20.

The nozzle-guide-vane assembly 22 is constructed in accordance with this invention and it will be appreciated from the following description the construction facilitates assembly and dismantling.

The stationary structure of the engine comprises a ring 23 forming part of the engine casing having a flange 24, hereinafter referred to as the supporting flange, upon which the nozzle-guide-vane assembly 22 and the stationary engine structure rearwardly of this flange is built up. The terms "forwardly" and "rearwardly" signify directions upstream and downstream respectively of the direction of flow through the turbine.

The nozzle-guide-vane assembly 22 comprises a plurality of segments each of which includes a fixed blade 25 extending between an inner platform 26 and an outer platform 27, which platforms are of part circular form and when assembled form rings with the blades 25 extending between them. The segments may conveniently be formed by a method of casting requiring comparatively little final machining.

Each outer platform 27 has an axial extension 28 extending forwardly from the leading edges of the blades 25 and constituting a shroud ring for the high pressure turbine blading. The extension has at its forward end a radially directed flange 29 which, when the nozzle-guide-vane assembly is assembled, lies approximately in the plane of the leading edge of the blading carried by the high compressor turbine disc 19. The flange 29 is formed near its periphery with a forwardly extending axial spigot 30 of arcuate form.

The spigots 30, when the nozzle-guide-vanes are assembled, constitute a circular spigot engaging in a recess 31 in a spigot ring 32 bolted to the supporting flange 24.

The flanges 29 on the forward ends of the extension 28 are also formed on their periphery with teeth or splines 33 which are engaged with corresponding teeth or splines 34 on an outer supporting ring 35 which encircles the platform 27. The outer supporting ring 35 is continuous and is spaced radially from the ring constituted by the platforms 27 thus providing a hollow space for stagnant gas or for the passage of cooling air. The outer supporting ring 35 has an outwardly-directed flange 36 by which it is bolted to the flange 24, so that the spigot ring 32 is nipped between the supporting flange 24 and the flange 36.

It will be appreciated that the spigotting of the platform segments 27 into the supporting ring 32 centralises the segments whilst the teeth or splines 33, 34 accommodate the torque reaction of the assembly and serve to locate the segments peripherally.

Each platform 27 at its rearward edge is formed with a radially extending flange 37 lying approximately in the plane of the rearward edges of the blades 25 and this flange 37 is formed with a spigot 38 engaging in a recessed spigot ring 39 which also has spigotted to it a shroud ring 40 for the low pressure turbine. The flanges 37 are also preferably provided with splines or teeth 41 which co-operate with inwardly directed teeth on the rearward end of the outer supporting ring 35.

The spigot ring 39 is secured by bolts not shown between the outwardly directed flange 42 and a ring member 43 encircling the shroud ring 40. The rear edge of the shroud ring 40 is spigotted into a recess 44 formed on the ring member 43. The rearward edge of the ring member 43 also carries an outwardly directed flange from which the outer casing 17 of the exhaust assembly is supported in any convenient manner.

The inner platform segments 26 are formed with inwardly directed flanges 45 which, when the assembly is completed, form a virtually continuous inwardly extending flange, and this flange enters a peripheral groove 46 formed by a pair of radial flanges on a sealing diaphragm 47 which extends inwardly towards the axis of the turbine. The flange 45 on each inner platform 26 is formed with a radial slot 45a, to receive a transverse pin 48 extending through the groove 46 in the periphery of the sealing diaphragm 47. This diaphragm is thus held against rotation and its inner edge carries a tapering cylinder or frusto-conical portion 49 extending between the turbine discs 19 and 20. The internal surface of the portion 49 is provided as a labyrinth seal co-operating with a rotating seal portion 50 formed on the external surface of a ring interposed between and rotating with the turbine discs 19 and 20.

It will be appreciated that the radial slots in the flanges 45, being uniformly distributed about the axis of the turbine assembly and engaging pins 48 in the periphery of the sealing diaphragm 47 likewise uniformly disposed, serve to centralise the diaphragm and accurately to determine the clearance in the labyrinth seal 49, 50, whilst the slot and pin arrangement permits relative expansion of the nozzle-guide-vane assembly 22 and the sealing diaphragm 47.

Cooling air which may be fed through a hollow turbine shaft or bore passes radially outwards and through passages 50a formed in the sealing portion 50 between the turbine discs 19 and 20 into the labyrinth. Since the pressure on the upstream side of the nozzle-guide-vane assembly 22 is greater than that on the downstream side, it is arranged that the metering of the cooling air by the labyrinth is effected appropriately, i. e. there is less resistance to the passage of air from the common source of supply through the labyrinth to the high-pressure side of the sealing diaphragm 27 than to the low pressure side.

The construction described above when used in the two stage turbine assembly as illustrated permits assembly by supporting the sealing diaphragm 47 spigot-wise temporarily on the part 50 in offering it up to the first stage disc 19 thereby preventing damage to the labyrinth; the nozzle-guide-vane segments constituted by the platforms 26, 27 and interconnected with blading 25, are then inserted radially inwardly to engage the pins on the diaphragm 47 by the flanges 45. The nozzle-guide-vane assembly segments are then centralised by their spigots 30 into spigot ring 32 and by the outer supporting ring 35 and the final tightening of the bolts by which the outer supporting ring 35 is secured to the supporting flange 24 disengages the sealing diaphragm 47 from its temporary spigot seating and maintains it centrally located through the pin and slot arrangement.

I claim:

1. An axial flow gas-turbine construction comprising in combination a turbine casing structure; a turbine nozzle structure supported from said casing structure and comprising a plurality of segmental elements which together form an annular turbine nozzle, each segment including an inner blade mounting platform, outer blade mounting platform and fixed blading interconnecting the platforms; means for locating said outer blade mounting platforms axially, radially and circumferentially in the said casing structure; turbine rotor disc means rotatably mounted within the turbine casing structure; labyrinth gas sealing means comprising a rotating ring rotatable with the turbine rotor disc means; and a stationary ring co-operating with the rotating ring; and spigot means provided on the inner platforms of said segmental elements on the surfaces of the inner platforms remote from the fixed blading, such spigot means locating the inner platforms circumferentially and axially relative to one another, engaging with the stationary ring to locate it axially and concentrically within the annular turbine nozzle, and permitting relative radial expansion between the stationary ring and the segmental elements, said spigot means forming the sole supporting means for the stationary ring.

2. An axial flow gas-turbine construction as claimed in claim 1 wherein said outer platforms are formed with outwardly-directed teeth formations and axially-directed spigot formations engaging complementary formations on said turbine casing structure whereby said outer platforms are located axially, radially and circumferentially with respect to the turbine casing structure and to one another.

3. An axial flow gas-turbine construction as claimed in claim 1 wherein the stationary ring encircles the rotating ring and has a radially-inwardly facing surface co-operating with a radially outwardly facing surface of the rotating ring to form the labyrinth gas-sealing means.

4. A multi-stage axial flow gas-turbine construction comprising in combination a turbine casing structure; a turbine nozzle structure supported from said casing structure and comprising a plurality of segmental elements which together form an annular turbine nozzle, each segmental element including an innner blade mounting platform, an outer blade mounting platform and fixed blading interconnecting the platforms; means for locating said outer blade mounting platforms axially, radially and circumferentially in the casing structure; turbine rotor means comprising a plurality of coaxial, axially-spaced rotor discs; labyrinth gas sealing means comprising a rotating ring located between two adjacent rotor dicsc to rotate therewith, and a stationary ring co-operating with the rotating ring; and spigot means interconnecting the inner platforms and the stationary ring and locating the inner platforms circumferentially and axially relative to one another, locating the stationary ring axially and concentrically with respect to the annular turbine nozzle and permitting relative radial expansion between the stationary ring and the segmental elements, said spigot means forming the sole supporting means for the stationary ring.

5. A multi-stage axial flow gas-turbine construction as claimed in claim 4 wherein said outer platforms are formed with outwardly-directed teeth formations and axially-directed spigot formations engaging complementary formations on said turbine casing structure whereby said outer platforms are located axially, radially and circumferentially with respect to the turbine casing structure and to one another.

6. A multi-stage axial flow gas-turbine construction as claimed in claim 4, wherein the stationary ring encircles the rotating ring and has a radially-inwardly facing surface co-operating with a radially-outwardly facing surface of the rotating ring.

CHARLES ALAN JUDSON.

REFERENCES CITED

The following references are of record in the file of this patent:

UNITED STATES PATENTS

| Number | Name | Date |
|---|---|---|
| 1,680,737 | Hodgkinson | Aug. 14, 1928 |
| 2,316,813 | Schaper | Apr. 20, 1943 |
| 2,442,019 | Ray | May 25, 1948 |
| 2,445,661 | Constant et al. | July 20, 1948 |